United States Patent [19]
Battersby

[11] Patent Number: 5,963,282
[45] Date of Patent: Oct. 5, 1999

[54] LIQUID CRYSTAL DISPLAY DEVICE AND APPARATUS INCLUDING SUCH

[75] Inventor: Stephen J. Battersby, Haywards Heath, United Kingdom

[73] Assignee: U.S. Philips Corporation, New York, N.Y.

[21] Appl. No.: 08/558,055

[22] Filed: Nov. 13, 1995

[30] Foreign Application Priority Data

Dec. 15, 1994 [GB] United Kingdom .................... 9425334

[51] Int. Cl.⁶ ............................ G02F 1/136; G02F 1/137; G09F 1/137
[52] U.S. Cl. .............................. 349/86; 349/116; 349/143
[58] Field of Search .................................. 359/67, 48, 72, 359/51, 85; 345/50, 52, 87, 207, 211; 349/86, 116, 61, 143, 110

[56] References Cited

U.S. PATENT DOCUMENTS

| | | | |
|---|---|---|---|
| 4,095,217 | 6/1978 | Tani et al. | 359/70 |
| 4,940,313 | 7/1990 | Hamatani | 359/72 |
| 5,160,920 | 11/1992 | Harris | 345/52 |

FOREIGN PATENT DOCUMENTS

| | | | |
|---|---|---|---|
| 60-147720 | 8/1985 | Japan | 349/113 |
| 9404958 | 3/1994 | WIPO | G02F 1/1333 |
| 9410668 | 5/1994 | WIPO | G09F 9/35 |

OTHER PUBLICATIONS

West et al., "P–49: Polymer–Stabilized Cholesteric Texture Materials for Black–on–White Displays", SID 94 Digest, pp. 608–610, 1994.

Primary Examiner—Hung X. Dang
Assistant Examiner—Tai V. Duong
Attorney, Agent, or Firm—Robert J. Kraus

[57] ABSTRACT

A liquid crystal display device (10) capable of displaying dark characters on a light background, for example a paper white type display, having an LC medium (20), such as PDLC material, switchable between a state in which ambient light incident on one side is back scattered towards a viewer and a state in which incident visible light is transmitted through the medium to a light absorber at the other side so that a viewer perceives a dark display, and in which a photovoltaic structure (25) is used as the light absorber for generating an output voltage in response to the visible light transmitted thereto. In equipment such as a portable computer or the like, the generated power can be utilised to supplement a battery power supply (45).

5 Claims, 2 Drawing Sheets

LIQUID CRYSTAL DISPLAY DEVICE AND APPARATUS INCLUDING SUCH

BACKGROUND OF THE INVENTION

The invention relates to a liquid crystal display device comprising a layer of liquid crystal medium, sets of electrodes disposed on opposing sides of the layer to which energising voltages are applied, the liquid crystal medium being switchable between at least a first state in which visible light incident from a front side of the layer is back-scattered and a second state in which said incident light is transmitted through the liquid crystal medium to the rear side, and a light absorber disposed at the rear side of the liquid crystal medium layer for absorbing the visible incident light transmitted therethrough. The invention relates also to apparatus including the display device.

An example of such a display device, and in particular a so-called paper white display device, is described in PCT WO 94/04958. The liquid crystal medium in this display device consists of a polymer dispersed liquid crystal (PDLC) film comprising a liquid crystal mixture forming microdroplets in an optically isotropic, transparent, polymer matrix. In the PDLC film, one refractive index of the liquid crystal mixture is chosen to be around the same as that of the cured polymeric matrix containing the liquid crystal microdroplets and differs from that of the cured pure polymer. In the unenergised, off, state in which no voltage is applied to the electrodes on opposing sides of this film, the liquid crystal molecules in the microdroplets adopt a distorted alignment and visible light incident thereon is back-scattered at the phase boundary between the polymeric and liquid crystal phases. In effect, therefore, incident light is reflected back in the general direction of the incident light so that to a viewer on that side the film takes on a white appearance under ambient lighting. When an energising, on, voltage is applied to the electrodes, the liquid crystal molecules in the microdroplets are aligned parallel to the field and perpendicular to the E vector of the light and the film becomes an optically isotropic medium for light incident generally perpendicularly of the film. The liquid crystal medium thus becomes transparent and incident light is transmitted through the film and is then absorbed by a black, light absorbing, back plane at the other, rear, side of the film. To the viewer the display device appears dark. In this way, and with the display device comprising an array, for example a row and column matrix, of individually energisable display elements, the display device can provide a display output consisting of dark, and particularly black, characters or graphical information on a white background rather like a conventional black-on-white printed page. In addition to the display appearance, such a display device has a number of advantages, including the fact that, unlike conventional transmissive and reflective T.N. type LC display devices, no polarisers are required and, unlike transmissive devices, a dedicated back-light is unnecessary which makes the display device particularly suitable for use in portable equipment, such as notebook computers, requiring battery power and in which the power consumption of the normally required back-light is significant.

A display device of this kind can be produced conveniently as a large area display device. It has been proposed that large area PDLC display devices, sometimes also referred to as microencapsulated NCAP display devices, can be used as outdoor display boards. For smaller display size applications such as computer displays, the display device can comprise a matrix array of individually operable display elements. The array can be of an active matrix addressed type in which each display element is driven via an associated switch device or of the simple passive matrix type.

Another black on white display device using a polymer dispersed type LC medium together with a black back plane is described in the paper entitled "Polymer-Stabilised Cholesteric Texture Materials for Black-on-White Displays" by J. L. West et al published in SID 94 Digest at pages 608 to 610. In this display device, the display elements are similarly switchable between highly reflective and transparent states. The PSCT liquid crystal material offers bistability and the display elements are switched between the two, stable, states by the application of voltage pulses.

SUMMARY OF THE INVENTION

It is an object of the present invention to provide an improved liquid crystal display device which is capable of offering greater functionality in equipment in which it is employed.

According to a first aspect of the present invention, there is provided a liquid crystal display device of the kind described in the opening paragraph which is characterised in that the light absorber comprises a photovoltaic structure for producing an output voltage in response to the visible light transmitted thereto through the liquid crystal medium.

The display device is capable of producing, for example, a paper white display whilst also having the advantage that the absorber layer required in such a display device provides additional functionality. The photovoltaic structure, being light absorbing, serves the dual function of absorbing light transmitted through the display medium for display purposes and also utilising the absorbed light in the manner of a solar cell through conversion into electrical power. The electrical power generated by the photovoltaic structure can be used advantageously, for example, in supplementing a power supply for the drive circuit of the display device. When used in, for example, portable equipment such as notebook computers or personal digital assistants, the present invention offers further improvement as regards power saving features, in addition to those mentioned previously.

According to a second aspect of the present invention, therefore, there is provided electronic apparatus, for example a portable computer or the like, comprising a display device according to the first aspect of the present invention and electrical power storage means for powering components of the apparatus to which the output of the photovoltaic structure is supplied. The power storage means may be that used to power the drive circuit of the display device and/or other electrical power consuming components of the apparatus. In a portable computer, for example, the power storage means may also be used to power such components as a disc drive or RAM memory as well as the processor and other associated electronic circuits. The output from the photovoltaic structure can be used either to supplement power from a battery source for powering certain of the components or, the case where the battery source comprises a rechargeable battery source, to recharge that source.

When used in other applications such as an outdoor display boards, the capability of generating power within the display device is especially advantageous as conventional power supplies such as mains supply lines may not be available.

It is known to provide a power generating solar cell and a display device together in portable apparatus such as pocket calculators and the like. In these known arrangements, the solar cells and the display devices are commonly separated physically from one another. Unlike these known arrangements, however, the present invention enables similar power generating capabilities while at the same time providing a considerably more compact arrangement by eliminating the need to provide in the apparatus design separate areas for the display and solar cell components. There is described in PCT WO94/10668 a pocket calculator in which a solar cell is arranged behind an LC display that produces a display output in a reflective mode of operation. The usual reflective layer at the rear of the display is replaced by a filter/reflector layer which reflects visible light for display purposes and transmits non-visible radiation, for example IR, which does not play a part in the display output to the solar cell.

For simple display purposes, such as dedicated datagraphic signs or indicators, the display device may be arranged in known manner to display a range of predetermined characters, symbols, or the like by suitably shaping the driving electrodes to provide the specific display information. For greater flexibility, however, as would be required for a computer screen for example, the display device comprises a matrix array of display elements, typically in rows and columns as in known matrix LC display panels, driven via sets of crossing row and column address conductors. Such a device may be either passively addressed or, by providing a switch device, for example a TFT or two terminal non-linear device such as a thin film diode, at each display element location, actively addressed.

The photovoltaic structure preferably is provided as a continuous structure extending over the display area of the device to maximise its light collection area. This also ensures that the light absorbing characteristic is uniform over the entire display area.

The photovoltaic structure preferably comprises a photodiode, for example an amorphous silicon p-i-n photodiode, although other structures known in the field of solar cells for example and capable of functioning as an adequate absorber of visible light and generating electrical power thereby could be used.

Depending on the nature of the photovoltaic structure, light absorption of some structures may not be as efficient throughout the visible spectrum as a dedicated conventional black absorber but nevertheless an adequately dark and sufficiently contrasting display effect, perhaps slightly coloured, can be obtained. The photovoltaic structure could incorporate means known in the art to enhance light absorption and reduce reflection.

The liquid crystal medium is preferably a PDLC medium although other kinds of liquid crystal medium which can be switched between a state in which incident light is back scattered or reflected and a state in which incident light is transmitted therethrough could be used.

The apparatus may include control means which is arranged to set at least a substantial part of the display area of the display device to the second, transmissive, state at selected times determined by the control means, for example in response to certain operational conditions. In the case, for example, of a portable computer the control means may monitor activity in the manner of a screen saver and set the display elements to their second state during periods of inactivity.

BRIEF DESCRIPTION OF THE DRAWING

Embodiments of display devices, and electronic apparatus incorporating such devices, in accordance with the present invention will now be described, by way of example, with reference to the accompanying drawings in which.

Figure 1:
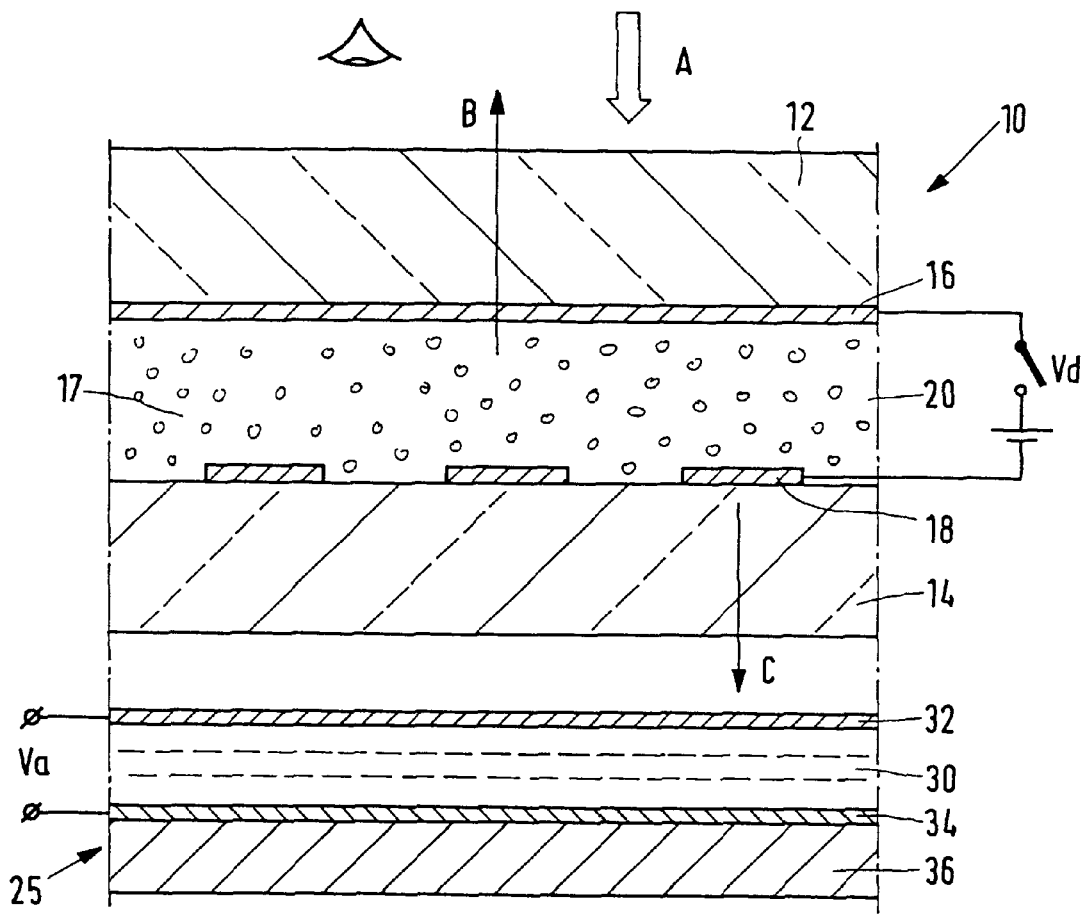
FIGS. 1 and 2 are schematic, cross-sectional views through two embodiments of display devices according to the present invention.

It should be understood that the Figures are merely schematic and are not drawn to scale. In particular certain dimensions such as the thickness of layers may have been exaggerated whilst others may have been reduced. The same reference numerals are used throughout the Figures to indicate the same or similar parts.

DESCRIPTION OF THE PREFERRED EMBODIMENTS

Figure 2:
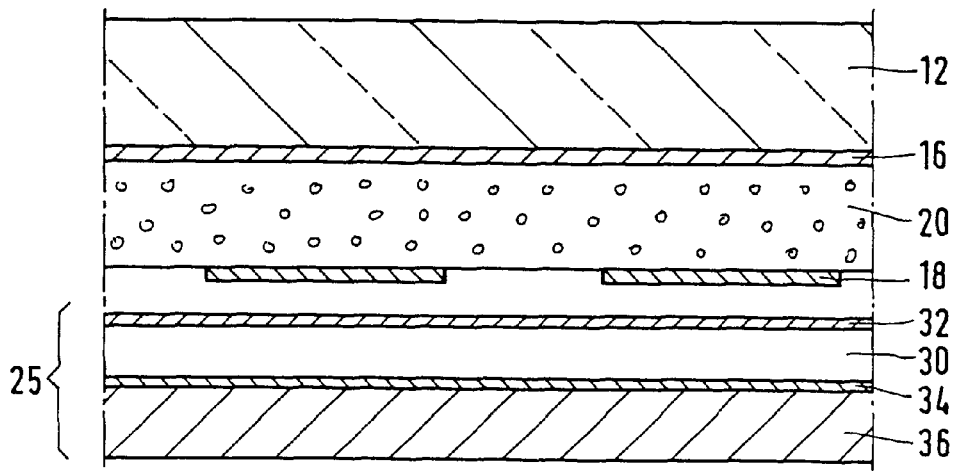

The embodiments of LC display devices of FIGS. 1 and 2 are each of a kind having a matrix array of display elements defining a coordinate system of rows and columns of pixels suitable for use as a display screen for displaying datagraphic information in, for example, a portable computer system or personal digital assistant (PDA).

Referring to FIG. 1, the display device 10 comprises first and second spaced transparent substrates 12 and 14 of glass or plastics material which carry on their opposing inner surfaces respectively sets of row and column conductors 16 and 18 of transparent conductive material such as ITO which define at their intersections a row and column array of individual display elements 17. The gap between the substrates 12 and 14 is filled with a PDLC film 20 comprising a liquid crystal mixture forming microdroplets dispersed in an optically isotropic, transparent polymer matrix. Examples of suitable PDLC films, and their preparation and operation, are described in PCT WO 94/04958 to which reference is invited and whose disclosure in this respect is incorporated herein by reference. With appropriate selection of LC and polymer materials, their refractive indices, and parameters such as droplet size and film thickness as described in the aforementioned specification, the PDLC film can be used in a display device to produce a so-called paper white display output.

The operation of the PDLC film 20 in this respect will be described briefly. One of the refractive indices of the LC mixture in the film is closely matched to that of the polymer matrix material. The effective transparency of the film can be varied by applying a voltage across the film via the electrodes 16 and 18. In a quiescent, non-energised, state the liquid crystal molecules in the microdroplets adopt a distorted, non-parallel, alignment which results in ambient visible light, indicated by arrow A in FIG. 1, which is incident on the film through the substrate 12 being effectively reflected and scattered at the phase boundaries between the polymeric and liquid crystal phases. Light is thus back-scattered in the general direction of the incident light, as indicated by the arrow B, so that to a viewer at the same, front, side of the display device as the incident light, and, with the appropriate degree of back-scattering, the PDLC film appears white.

In the energised state in which a drive voltage, as denoted at Vd in FIG. 1, is applied to selected electrodes 16 and 18 across the PDLC film, the LC molecules at the region between the electrode 16 and the electrode 18 become aligned with the electric field. The film then effectively becomes transparent and ambient visible light, A, incident generally normally of the film and generally parallel to the aligned LC molecules, is transmitted through the film, as indicated by the arrow C. This transmitted light passes through the transparent electrode 18 and the substrate 14 and is incident on a black, light absorbing, back plane 25 at the rear side of the film where it is absorbed. To a viewer at the light incident, front, side of the device, the display then appears black.

By selective control of the display elements of the array, black, or dark, characters on a white, or light, background can be displayed simulating, for example, the visual effect of a printed page with black ink on white paper.

In accordance with the present invention, the light absorbing layer 25 comprises a photovoltaic structure. This structure serves the dual function of absorbing incident visible light transmitted to the rear side of the film 20 and generating electrical power by photoelectric conversion of the received light.

In the embodiment of FIG. 1, the photovoltaic structure comprises an amorphous silicon photodiode structure of conventional form which consists of an amphorous silicon semiconductor layer 30 which is doped to provide a p-i-n structure with electrical contact layers 32 and 34 on its opposing surfaces. At least the contact layer 32 is of optically transparent conductive material such as ITO to allow light to reach the layer 30. The other contact layer 34 can be of opaque metal such as chromium. Various other kinds of photovoltaic structures known for example in the field of solar cells could be used instead. The darkness perceived by a viewer will be dependent on the light absorbing efficiency across the visible spectrum of the photovoltaic structure employed. In some cases, this may not always be as great as that achieved with a conventional black absorber. Whilst an adequately dark and contrasting display effect should be obtainable, it may be slightly coloured.

The photovoltaic structure 25 is fabricated on an insulating support 36 using conventional thin film deposition and processing techniques and is spaced a small distance, typically less than 100 μm, from the rear surface of the substrate 14 by an air gap so as to be optically decoupled from the substrate 14, as discussed in PCT WO 94/04958. The photovoltaic structure 25 can be assembled in spaced relationship with the film 20 using a variety of different techniques as described in the aforementioned specification. The effectiveness of the structure 25 in absorbing incident visible light can be enhanced by for example applying an anti-reflection coating over its input surface to reduce the possibility of some of the incident light being reflected back towards the viewer, or by any other techniques known in the art of solar cells, for example, providing an embossed or roughened surface layer at the input side of the structure, to maximise the light absorption characteristics and increase the "blackness" perceived by a viewer if necessary.

The structure 25 could instead be secured to the substrate 14 by an adhesive having a low refractive index of the appropriate thickness, in which case the support 36 could be dispensed with. The structure 25 could perhaps even be provided directly on the surface of the substrate 14 although this would likely result in inferior display performance.

Various other modifications are possible. Because of the self-supporting nature of the PDLC film 20, the electrodes 16 and 18 could be provided on the opposing surfaces of the film and the substrates 12 and 14 eliminated. In the embodiment illustrated in FIG. 2, the electrodes 18 are deposited directly on the surface of the film 20 whilst the substrate 12 is retained to provide structural rigidity to the display device.

In the embodiments of both FIGS. 1 and 2, the photovoltaic structure 25 extends as a large area photodiode structure continuously, and completely, over the display area of the display device, as determined by the area of the row and column array of the display elements 17. The photovoltaic structure 25 could perhaps occupy only a portion of the display area with the remaining portion being backed by a conventional light absorber but, such an arrangement could produce a non-uniform blackness over the display area due to the different natures of the light absorbing materials as well as resulting in less electrical power generated because of the smaller light collection area of the photovoltaic structure. The structure 25 acts as a large area solar cell providing an output voltage, as denoted by Va in FIG. 1 in response to ambient visible light transmitted through the substrate 12, the film 20 and the substrate 14 falling thereon.

As previously described, a PDLC display device is particularly advantageous in portable equipment such as a notebook computer or a PDA since it does not require a backlight, unlike commonly used twisted nematic LC display devices operating in transmissive mode for example. Consequently, the demands on the power supply in such equipment, typically a rechargeable battery pack, are significantly less so that, extended operating times are obtained. The invention further enhances this advantage in that the electrical power generated by the photovoltaic structure 25 in operation can be utilised to supplement the power supply in such equipment.

Figure 3:
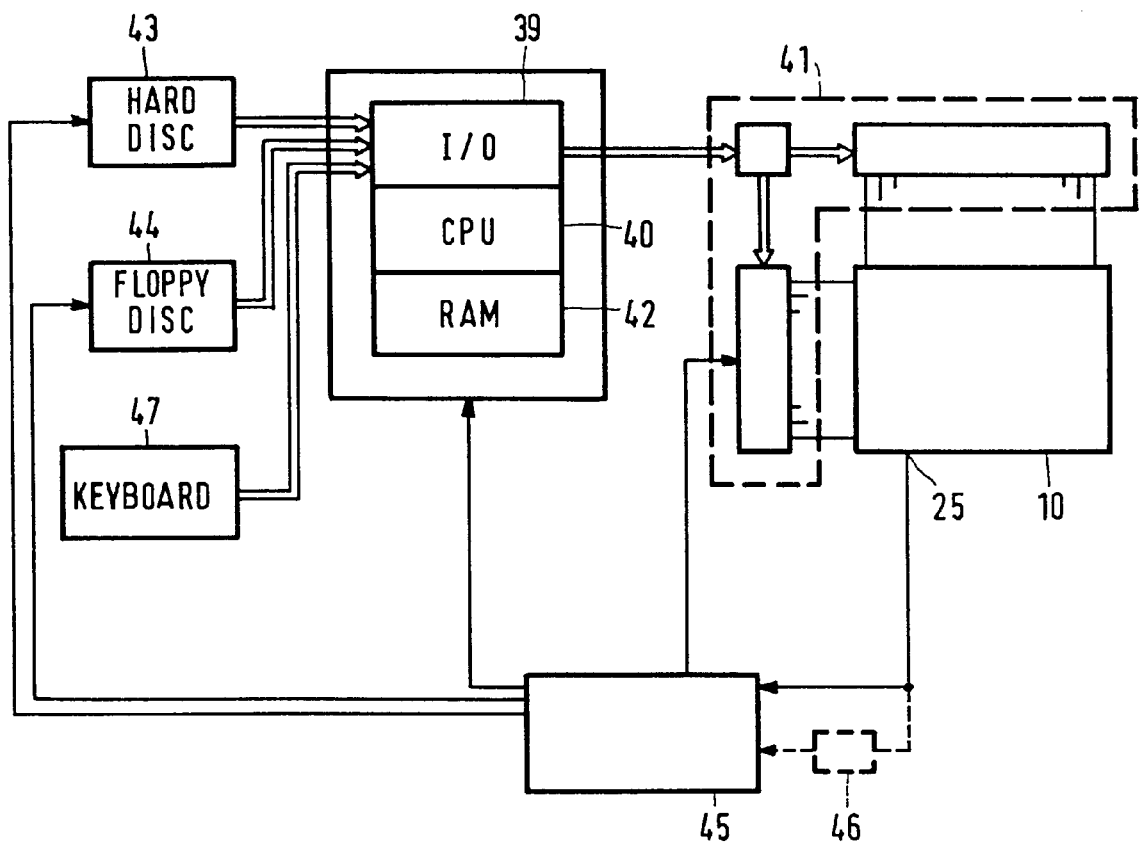
FIG. 3 is a schematic block diagram of a computer system including a display device according to the present invention.

FIG. 3 illustrates in simple diagrammatic block form a portable computer as an example of an electronic apparatus using the display device. A typical portable computer comprises, in addition to the display device 10, a CPU 40, with an input/output interface circuit 39, a display drive circuit 41, a RAM memory 42, a hard disc drive 43 and a floppy disc drive 44 as well as a keyboard 47. When used away from a mains supply, all these components are powered by a power supply unit 45 which incorporates a rechargeable battery pack. The voltage generated by the photovoltaic structure 25 of the display device may be supplied to the power supply unit 45 for use in re-charging the battery pack or alternatively supplied to a supplementary power storage unit 46 which provides back-up electrical power to certain critical components only such as the RAM memory.

The amount of light reaching the photovoltaic structure 25 is dependent on the number of display elements in the array which are in their transmissive/transparent state allowing ambient light to reach the structure. In normal operation of equipment such as computer or PDA systems using the display device the number of black or dark display elements varies according to the particular information, e.g. characters, being displayed. A useful output from the photovoltaic structure may be obtained in many situations. However, to improve the power generating performance, it can be arranged that in periods when the system is inactive, that is, not being used, the display elements of the array, or at least a substantial proportion, are driven to their transparent state so as to permit more light to reach the photovoltaic structure, and thus maximise the electrical-power output in these periods. The operation of the display device in this manner can be controlled by software which is stored in the system RAM and is responsive to a lack of any input by a user, for example via the keyboard or mouse in a computer system over a specified period of time or by any other means which, for example, monitors the apparatus for certain operational conditions such as periods of inactivity to set the display device to a "black" display output state rather like the way in which screen-saver software in computer systems work. Alternatively, and bearing in mind that typically when displaying for example black text on a white background the number of black or dark display elements is small compared with the number of white display elements, it could be arranged, again using software operating in a screen saver manner, that as a result of inactivity in the apparatus, e.g. the lack of any input over a specified period of time, the display drive circuit switches the display device to an inverse display mode, that is with white characters on a black or dark background, with the additional benefit that the displayed information is still available to the user.

Of course, if an LC medium is used which is of a kind that exhibits bistability, that is, one which remains in a transmissive or reflective state to which it is driven by an applied voltage without the need to apply thereafter maintaining voltages, the display element could simply be left in their transmissive state during periods of non-use.

The display device may be used in other kinds of equipment, for example, information signs, and in this case a simple control unit may be arranged to set the display element array to a "black" or inverse display output for predetermined periods at regular intervals.

Although in the above described embodiments of display devices, a simple, passively addressed kind of display element array is described it will be appreciated that active matrix addressed arrays can also be used in which each display element is driven via a respective switching element, for example a TFT or thin film diode in known manner.

The display device need not comprise a row and column array of display elements but could instead comprise other electrode configurations defining different display element shapes, for example in the form of predetermined characters or symbols, seven-segment alpha-numeric character configurations and the like in the case of display devices for dedicated display purposes such as signs and indicators.

Although in the above described embodiments reference is made to paper white displays in particular, it will be appreciated that a colour rather than white output can be obtained instead of incorporating dye material in the PDLC film. Also, the display elements may be switchable to states intermediate to the two states mention to provide a grey output. Moreover, although the above-described embodiments of the invention involve PDLC materials, it is envisaged that the invention can be used with other kinds of liquid crystal displays which are switchable between a state in which incident ambient light is back-scattered or reflected towards a viewer and a state in which incident ambient light is transmitted to, and absorbed by a light absorber at the rear side of the display device, to produce a display effect.

From reading the present disclosure, other modifications will be apparent to persons skilled in the art. Such modifacations may involve other features which already known in the field of display devices which may be used instead of or in addition to features already described herein.

I claim:

1. A liquid crystal display device having a display area and comprising:
  a. a liquid crystal medium extending across the display area and including first and second sides, said medium having a reflective state in which visible light incident to the first side is backscattered and having a transmissive state in which visible light incident to the first side is transmitted through said medium;
  b. first and second arrangements of electrodes arranged adjacent the first and second sides, respectively, said arrangements overlapping at predefined areas of the liquid crystal medium that can be selectively placed in the transmissive state by applying a predetermined voltage to selected ones of the electrodes in at least one of the first and second arrangements, said predetermined areas being substantially uniformly distributed across and covering a major part of the display area and said electrodes being light-transmissive at least at said predefined areas; and
  c. light-absorbing means disposed opposite the second side of the liquid crystal medium for substantially preventing light transmitted through the medium from returning to said medium, said light-absorbing means including a photovoltaic structure which is disposed for receiving substantially all of the visible light transmitted through the predefined areas of the liquid crystal medium and is operable for producing an output voltage in response to the received visible light.

2. The display device as in claim 1, wherein the first and second arrangements of electrodes comprise transversely-arranged row and column electrode arrangements, respectively.

3. The display device as in claim 1, wherein the liquid crystal medium comprises a PDLC material.

4. A liquid crystal display device having a display area and comprising:
  a. a liquid crystal medium extending across the display area and including first and second sides, said medium having a reflective state in which visible light incident to the first side is backscattered and having a transmissive state in which visible light incident to the first side is transmitted through said medium;
  b. first and second arrangements of electrodes arranged adjacent the first and second sides, respectively, said arrangements overlapping at predefined areas of the liquid crystal medium that can be selectively placed in the transmissive state by applying a predetermined voltage to selected ones of the electrodes in at least one of the first and second arrangements, said predetermined areas being substantially uniformly distributed across and covering a major part of the display area and said electrodes being light-transmissive at least at said predefined areas; and
  c. light-absorbing means disposed opposite the second side of the liquid crystal medium for substantially preventing light transmitted through the medium from returning to said medium, said light-absorbing means including a photovoltaic structure:
    which is disposed for receiving substantially all of the visible light transmitted through the predefined areas of the liquid crystal medium;
    which is operable for producing an output voltage in response to the received visible light; and
    which comprises a photodiode structure extending continuously across the display area of the liquid crystal medium.

5. A liquid crystal display device having a display area and comprising:
  a. a liquid crystal medium extending across the display area and including first and second sides, said medium having a reflective state in which visible light incident to the first side is backscattered and having a transmissive state in which visible light incident to the first side is transmitted through said medium;
  b. first and second arrangements of electrodes arranged adjacent the first and second sides, respectively, said arrangements overlapping at predefined areas of the liquid crystal medium that can be selectively placed in the transmissive state by applying a predetermined voltage to selected ones of the electrodes in at least one of the first and second arrangements, said predetermined areas being substantially uniformly distributed across and covering a major part of the display area and said electrodes being light-transmissive at least at said predefined areas;

c. light-absorbing means disposed opposite the second side of the liquid crystal medium for substantially preventing light transmitted through the medium from returning to said medium, said light-absorbing means including a photovoltaic structure which is disposed for receiving substantially all of the visible light transmitted through the predefined areas of the liquid crystal medium and is operable for producing an output voltage in response to the received visible light; and d. control means for placing ones of the predefined areas covering at least a majority of the display area into the transmissive state.

* * * * *